(12) United States Patent
Vaddiparty et al.

(10) Patent No.: US 7,672,639 B2
(45) Date of Patent: Mar. 2, 2010

(54) METHOD AND SYSTEM FOR ROUTING TELEMETRY IN A SIMPLEX MODE

(75) Inventors: Subrahmanyam V. Vaddiparty, San Jose, CA (US); Brinda T. Shah, Milpitas, CA (US); Paul A. Monte, San Jose, CA (US)

(73) Assignee: Globalstar, Inc., Milpitas, CA (US)

( * ) Notice: Subject to any disclaimer, the term of this patent is extended or adjusted under 35 U.S.C. 154(b) by 1376 days.

(21) Appl. No.: 10/353,618

(22) Filed: Jan. 29, 2003

(65) Prior Publication Data

US 2004/0147220 A1 Jul. 29, 2004

(51) Int. Cl.
H04B 1/185 (2006.01)
H04Q 7/20 (2006.01)
H04B 7/00 (2006.01)

(52) U.S. Cl. .............. 455/13.1; 455/12.1; 455/427; 455/66.1

(58) Field of Classification Search ........... 455/12.1, 455/13.1, 458, 427, 428, 430, 429, 431, 13.2, 455/67.13, 516, 226.1; 702/188; 45/13.1; 340/539.1
See application file for complete search history.

(56) References Cited

U.S. PATENT DOCUMENTS

| | | | |
|---|---|---|---|
| 1,690,719 A | 11/1928 | Chaffee et al. |
| 1,987,889 A | 1/1935 | Beverage et al. |
| 3,114,900 A | 12/1963 | Anderson |
| 3,705,385 A | 12/1972 | Batz |
| 3,786,423 A | 1/1974 | Martell |
| 3,858,212 A | 12/1974 | Tompkins et al. |
| 3,860,872 A | 1/1975 | Richardson et al. |
| 3,878,527 A | 4/1975 | Rensin et al. |
| 4,013,962 A | 3/1977 | Beseke et al. |
| 4,040,046 A | 8/1977 | Long et al. |
| 4,152,651 A | 5/1979 | Lampert et al. |
| 4,190,800 A | 2/1980 | Kelly, Jr. et al. |
| 4,193,030 A | 3/1980 | Rabow et al. |
| 4,222,115 A | 9/1980 | Cooper et al. |
| 4,225,935 A | 9/1980 | Zscheile, Jr. et al. |
| 4,231,113 A | 10/1980 | Blasbalg |
| 4,241,447 A | 12/1980 | Epstein |
| 4,313,211 A | 1/1982 | Leland |
| 4,317,204 A | 2/1982 | Gordy et al. |
| 4,337,466 A | 6/1982 | Spahn |

(Continued)

FOREIGN PATENT DOCUMENTS

EP 0545636 A1 * 9/1993

Primary Examiner—Tilahun Gesesse
(74) Attorney, Agent, or Firm—Kenneth W. Float (57) ABSTRACT

A satellite based communication system in a low-earth-orbit (LEO) has multiple beams and FDM channels within each beam for voice/data communication between user terminals and multiple gateways. The satellite based communication system has two links for duplex communication, i.e., a forward link between the gateway and the user terminals through the satellites and a return link between the user terminals and the gateway through the satellites. Low volume telemetry data from remotely located assets, such as liquid petroleum gas tanks, water tanks, oil storage tanks, rail cars is gathered, processed, and transferred to a customer over an Internet link. A remote telemetry unit with a sensor and a simplex transmitting unit transmits remote telemetry data. A gateway receives data and directs the data to a gateway applique for demodulating and decoding. Resulting messages are sent to the customer via a back office over an Internet connection.

22 Claims, 5 Drawing Sheets

U.S. PATENT DOCUMENTS

| | | | |
|---|---|---|---|
| 4,977,577 A | 12/1990 | Arthur et al. | |
| 5,987,058 A | 11/1999 | Sanderford et al. | |
| 6,048,366 A * | 4/2000 | Ellis et al. | 703/8 |
| 6,128,469 A | 10/2000 | Zenick, Jr. et al. | 455/12.1 |
| 6,148,179 A * | 11/2000 | Wright et al. | 455/66.1 |
| 6,160,998 A * | 12/2000 | Wright et al. | 455/66.1 |
| 6,163,681 A * | 12/2000 | Wright et al. | 455/66.1 |
| 6,167,238 A * | 12/2000 | Wright | 455/66.1 |
| 6,226,493 B1 * | 5/2001 | Leopold et al. | 455/13.1 |
| 6,317,029 B1 | 11/2001 | Fleeter | |
| 6,366,776 B1 * | 4/2002 | Wright et al. | 455/427 |
| 6,396,819 B1 | 5/2002 | Fleeter et al. | |
| 6,477,355 B1 * | 11/2002 | Grayson et al. | 455/13.4 |
| 6,538,561 B2 * | 3/2003 | Angus | 340/7.21 |
| 6,556,809 B1 * | 4/2003 | Gross et al. | 455/12.1 |
| 6,567,661 B2 * | 5/2003 | McDonnell et al. | 340/870.07 |
| 6,628,921 B1 * | 9/2003 | Vaddiparty et al. | 455/12.1 |
| 6,675,013 B1 * | 1/2004 | Gross et al. | 455/431 |
| 6,826,514 B1 * | 11/2004 | Antico et al. | 702/188 |
| 6,850,732 B2 * | 2/2005 | Patterson et al. | 455/12.1 |
| 6,915,238 B2 * | 7/2005 | Watts et al. | 702/188 |
| 7,099,770 B2 * | 8/2006 | Naden et al. | 701/117 |
| 7,337,061 B2 * | 2/2008 | Naden et al. | 701/117 |

\* cited by examiner

METHOD AND SYSTEM FOR ROUTING TELEMETRY IN A SIMPLEX MODE

BACKGROUND OF THE INVENTION

1. Field of the Invention

The present invention relates to using a satellite communication system to provide a cost-effective way of routing remote telemetry data to customers and, more particularly, to receiving telemetry data in a simplex mode along with normal traffic.

2. Description of the Related Art

What is the inventory level of your remote storage tank? The level and water-quality of your water tank? Where and when did your rail car deliver last? These are important questions for many industrial operations. There is a need for a cost-effective way to collect basic environmental and industrial data in real time. Applications include remote monitoring of water and fuel tanks, pipelines, or electric power lines, as well as asset tracking of shipping containers or construction equipment. Not that long ago, keeping track of remote assets involved people going out in the field and recording data with pencils and paper. Later, computer systems were used to monitor remote assets, but it still was not satisfactory. Too much time is wasted in determining what remote assets are where and collected data often becomes obsolete after too much delay. There is a need for a satellite communication system that provides a cost-effective service for gathering, processing, and routing remote asset data to customers over an Internet connection.

Some satellite communication systems are too expensive and complex. Some do not provide this service in real time and have significant latency. Some systems have a kind of polling sequence that introduces a delay from the time data is ready to transmit to the time it is allowed to be transmitted. Some have duplex communication and do processing on-board, which are not necessary. There is a need for near real-time data delivery, i.e., no delay or negligible delay. Certain remote telemetry applications cannot tolerate latency. Some systems provide both monitoring and controlling remote assets at a complexity and cost that is intolerable for many remote assets. For these types of assets, the customer is only interested in data on an infrequent basis. Since the amount of data delivered to the customer is low and infrequent, a low cost alternative to existing systems is needed. In addition, once some systems are in place, they cannot add a new service like this later. Therefore, there is a need for a satellite communication system that provides a cost-effective way to gather, process, and route remote asset data to customers over an Internet connection in addition to its regular service.

The present invention augments an existing satellite communication system with a low data rate, low cost system for gathering, processing, and routing remote asset data to customers over an Internet connection. The present invention also reduces system noise and improves system performance.

The present invention has many advantages, including the following. Unlike costly, complex, and slow conventional systems, the present invention offers services in real time. In addition, most existing systems are duplex systems that are used for both monitoring and controlling remote assets. This is done at a complexity and cost that cannot be tolerated for many remote telemetry applications that infrequently route the status, condition, or location of remote assets to a customer. The present invention also provides superimposition of a simple protocol over existing infrastructures to provide a low cost solution to monitoring remote assets. Repeating transmissions and allowing for variable length messages is a relatively low cost way for the present invention to increase the robustness of system performance. Additional advantages over conventional systems are using a priori satellite ephemeris data to compensate for Doppler shift and selectively turning various inputs on or off to reduce system noise and improve system performance. Furthermore, adapting the existing satellite communication infrastructure to provide the additional service of routing remote telemetry data is done quickly, easily, and at very low recurring and non-recurring developmental costs.

SUMMARY OF THE INVENTION

The present invention is directed to systems, methods, data structures, signals, and apparatus that provide a cost-effective way to gather, process, and route remote asset data to customers in addition to the regular service of a satellite communication system.

A telemetry unit has a transmitter that transmits telemetry data in a simplex mode to a satellite. A system for routing telemetry data has a gateway subsystem with an antenna to receive a compound signal from a satellite. The compound signal has both normal traffic over a low-earth-orbit (LEO) satellite communication system and remote telemetry data. The remote telemetry data is superimposed on the normal traffic. A gateway applique, which is capable of receiving the compound signal, extracts the telemetry data and transmits the telemetry data to a network.

In one method of routing telemetry data, the telemetry data is received in a simplex mode at a satellite having a bent-pipe configuration. The telemetry data is combined with normal traffic in a compound signal. The compound signal is transmitted from the satellite to a gateway applique, where telemetry data is extracted from the compound signal. In another method of routing telemetry data, the telemetry data is transmitted via a telemetry unit in a simplex mode to a satellite over a low-earth-orbit communications system. The telemetry data is superimposed over regular traffic on the low-earth-orbit communications system to form a compound signal.

These and other features, aspects, and advantages of the present invention will become better understood with reference to the drawings, description, and claims.

DESCRIPTION OF THE PREFERRED EMBODIMENTS

In the following detailed description, reference is made to the accompanying drawings. These drawings form a part of this specification and show by way of illustration specific preferred embodiments in which the present invention may be practiced. These embodiments are described in sufficient detail to enable those skilled in the art to practice the present invention. Other embodiments may be used and structural, logical, and electrical changes may be made without departing from the spirit and scope of the present invention. Therefore, the following detailed description is not to be taken in a limiting sense and the scope of the present invention is defined only by the appended claims.

The present invention may be practiced with many and various satellite communication systems, including Globalstar satellite communication systems. Globalstar satellite communication systems are available from Globalstar LP headquartered in San Jose, Calif.

Figure 1:
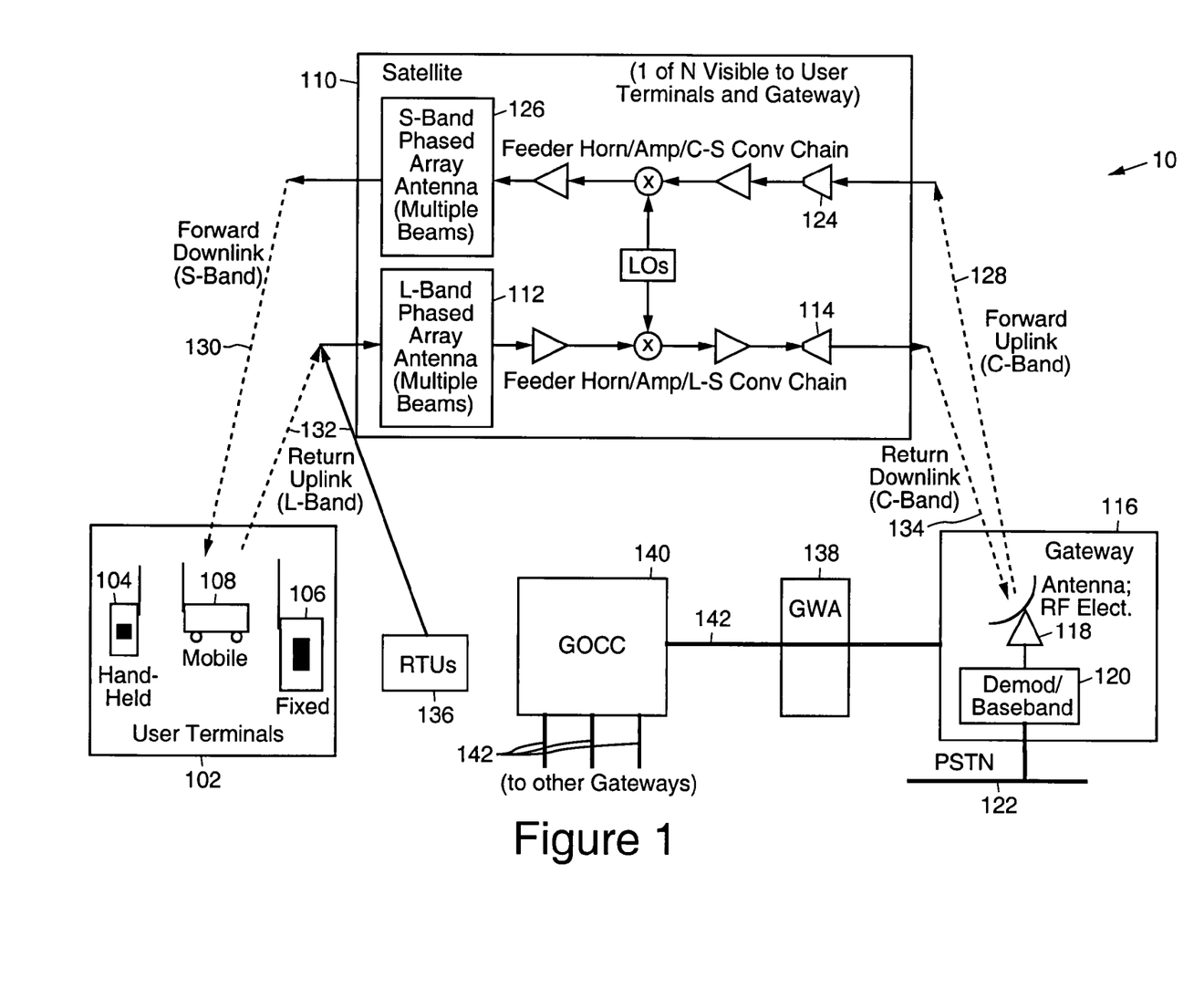
FIG. 1 is a block diagram showing an overview of a satellite communication system according to the present invention.

FIG. 1 shows an overview of a satellite communication system 100 according to the present invention. It will be evident to those skilled in the art, that to practice the present invention, satellite communication system 100 may have one each or any number of beams, frequencies, gateways, control centers, and satellites at different altitudes. In this example, satellite communication system 100 is a low-earth-orbit system with multiple beams and multiple frequency division multiplexed (FDM) channels within each beam. This facilitates voice and/or data communication between disparately located user terminals 102.

User terminals 102 are any type of transmitting device capable of operating with the satellite communication system and can be either hand-held user terminals 104, attached to the ground as fixed user terminals 106, or vehicle user terminals 108. User terminals 102 have baseband and radio frequency (RF) electronics. Additionally, user terminals 102 have antennas to transmit voice and/or data to satellites 110 and to receive voice and/or data from the satellites 110.

Satellites 110 receive transmissions from user terminals 102. Satellites 110 are low-earth-orbit satellites and bent-pipe repeaters that receive transmissions through an L-band antenna 112, such as an L-band spacecraft antenna. Antenna 112 may be multi-beam, phased array, or other type of antenna. For example, satellites 110 illuminate Earth with multiple beams for receiving from user terminals 102 and transmitting to user terminals 102. Although the structure of these beams may vary, a continuously orbiting constellation of satellites 110 provide coverage over most of Earth's surface twenty four hours a day. In an integrated world-wide system, subscribers are given the flexibility to utilize user terminals 102 anywhere in the world (roaming). Satellites 110 upconvert from L-band to C-band and amplify the received signals in chain 114 and re-transmit to a gateway RF subsystem or gateway 116 on the ground.

Gateway 116 receives the energy transmitted by satellites 110 within its field-of-view and has an antenna and RF electronics 118. Gateway 116 also has downconversion, demodulation, and baseband electronics 120 to reproduce the voice and/or data generated at user terminals 102 in digital form. The resulting digital stream is interfaced with a Public Switched Telephone Network (PSTN) infrastructure 122. Once the voice and/or data has entered the PSTN infrastructure 122, it is directed to its destination, including back to another user terminal 102, if desired. Conversely, voice and/or data entering gateway 116 through the PSTN infrastructure 122 is transmitted to satellites 110. Satellites 110 amplify, down-convert from C- to S-band in chain 124, and re-transmit the data to user terminals 102 through an antenna 126. Antenna 126 may be an S-band spacecraft antenna, multi-beam, phased array, or any other type of antenna. Due to the co-visibility of satellites 110 to a given user terminal 102 and gateway 116, multiple paths may be established between them. The effect of this diversity is exploited to enhance system performance for voice and/or data applications.

A forward link 128, 130 and a return link 132, 134 allow for duplex communication. In duplex communication, signals may flow in both directions at the same time. Forward link 128, 130 is the path from gateway 116 along an uplink at C-band 128 to satellites 110 and from satellites 110 along a downlink at S-band 130 to user terminals 102. Return link 132, 134 is the path from user terminals 102 along an uplink at L-band 132 to satellites 110 and from satellites 110 along a downlink at C-band 134 to gateway 116.

A frequency plan for forward link 128, 130 within satellite communication system 100 has a number of different frequency division multiplexed (FDM) channels centered at frequencies that are continuously spaced within assigned frequency allocation. The FDM channels may be 1.23 MHz wide in frequency. Each FDM channel contains multiple voice and/or data signals as well as overhead functions such as pilot, paging, and synchronization signals. Thus, forward link 128, 130 has a number of FDM channels per beam and a number of beams that provide for frequency re-use. A spread spectrum communication technique known as direct sequence (DS) spreading in conjunction with code division multiple access (CDMA) or DS-CDMA is used to transmit these signals from gateway 116 to user terminals 102 through satellites 110. A frequency plan for return link 132, 134 is similar to that of forward link 128, 130. The number of FDM channels for return link 132, 134 varies depending on the region, the number of operating CDMA systems, regulatory issues, and inter-system coordination efforts.

A gateway operational control center (GOCC) 140 defines allocation strategies. Under these strategies, gateway 116 assigns a specific FDM channel to a given user terminal 102. GOCC 140 is responsible for managing gateways 116 across the world and is connected to each gateway 116 via a network 142.

Satellite communication system 100 is able to offer additional services by adding different transmitting devices and corresponding electronics at gateway 116 to receive and process these transmissions. One such service is the gathering, transmitting, and routing of low volume telemetry data at low data rates from remotely located assets. A low data rate is a rate less than about 9,600 bits per second (bps), such as 100 bps. Examples of remote assets include liquid petroleum gas (LPG) tanks, water tanks, oil storage tanks, rail cars, and other remote assets. For example, some remote assets are unable to utilize existing terrestrial infrastructure, such as the public switched telephone network (PSTN). By operating in a simplex mode at low data rates with simple protocols, a low cost system can be deployed. Costs are low both for both the transmission and reception/processing ends of the communication link. Furthermore, the low data rate allows the telemetry routing service to operate without the diversity inherent in satellite communication system 100 as described above. Taking advantage of the diversity is a costly endeavor that is avoided in this simpler remote telemetry system. In short, the present invention augments or supplements satellite communication system 100 with a low cost telemetry data routing service. Part of this added service, remote telemetry system, or applique is a telemetry unit or remote telemetry unit (RTU) 136 and a gateway applique (GWA) 138 which are discussed in detail with respect to FIGS. 2A and 2B.

Figure 2A:
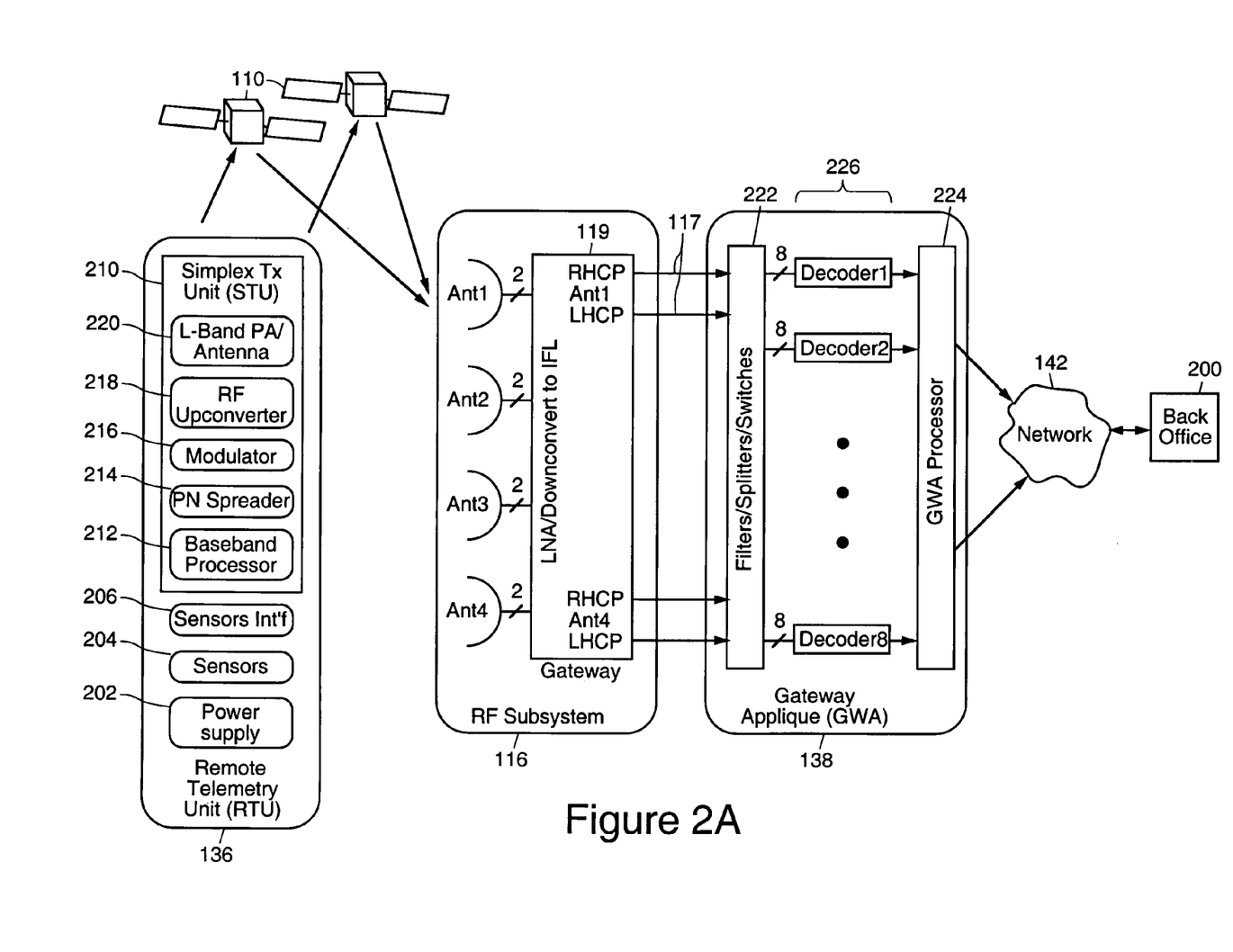
FIGS. 2A and 2B are block diagrams showing a more detailed view of a satellite communication system according to the present invention than FIG. 1.
Figure 2B:
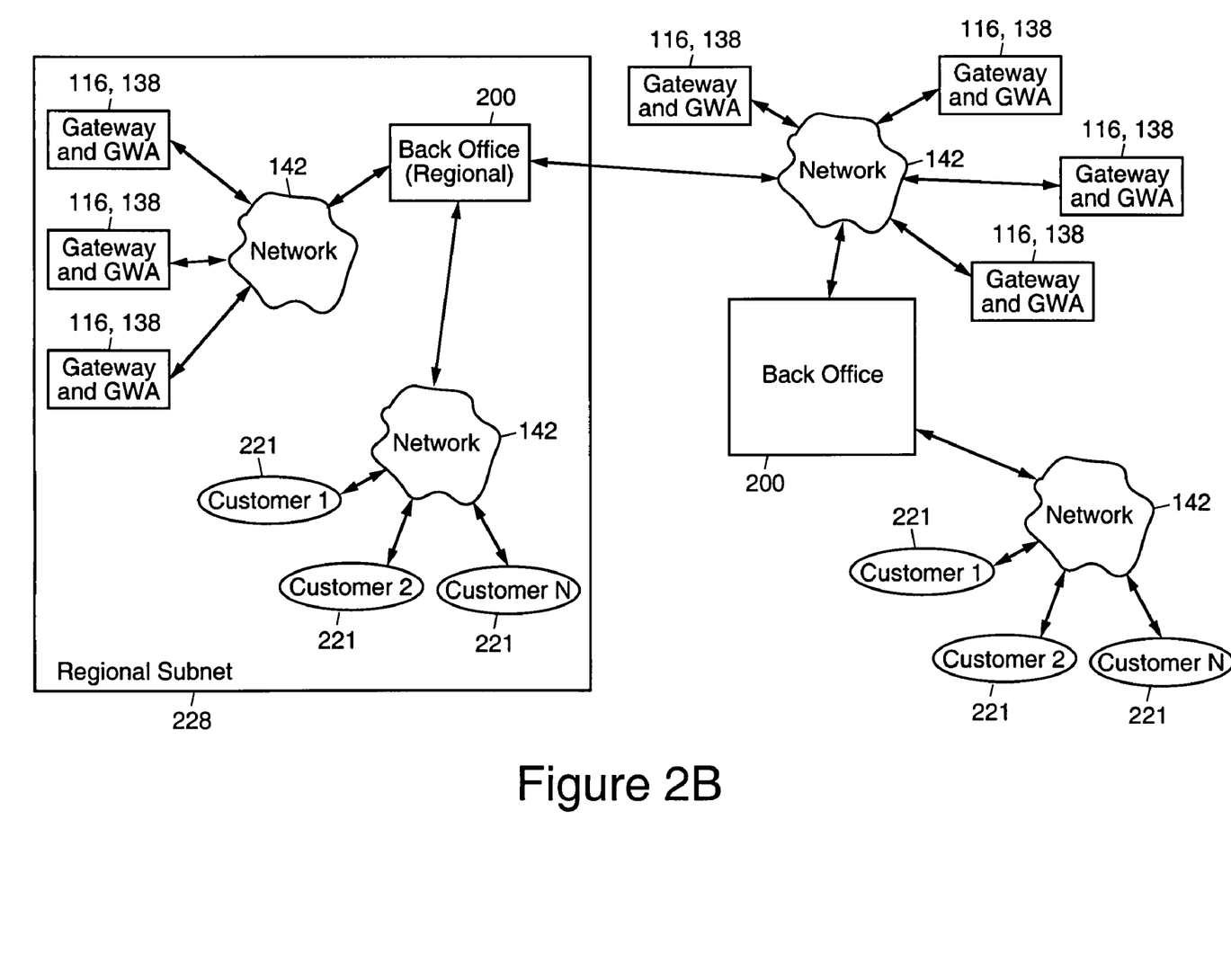

FIGS. 2A and 2B show the architectural concept for the remote telemetry system. The system has remote telemetry unit 136, satellites 110, gateway applique 138, and a central back office, processor, or back office 200.

Remote telemetry unit 136 has a power supply 202, one or more sensors 204, one or more sensor interfaces 206, and a simplex transmitting unit (STU) 210, all of which may be integrated into a field deployable package. Examples of power supplies include batteries, solar cells, and standard 110 volts alternating current (VAC). Sensors 204 may be application specific or a field deployable or any other type of sensor. Some examples of sensors 204 include pressure gages, level sensors, velocity sensors (for mobile assets). Sensors 204 and sensor interfaces 206 generate binary data in a standard RS232 format for simplex transmitting unit 210. This standard RS232 interface allows a variety of remotely located assets to be monitored. Remote telemetry unit 136 is factory or customer programmed to transmit data periodically, such as at an a priori set time or on an event-driven basis. For example, if sensor 204 determines a water level is below a certain threshold in a water tank, then telemetry data is transmitted by simplex transmitting unit 210 to satellites 110.

Simplex transmitting unit 210 has a baseband processor 212, a pseudo-noise (PN) spreader 214, a modulator 216, an RF upconverter 218, and an L-band power amplifier (PA)/antenna 220 to transmit telemetry data. Unlike the other user terminals 102 (see FIG. 1) that use duplex communication, remote telemetry unit 136, which contains simplex transmitting unit 210, uses simplex communication. Simplex communication is where communication flows only in one direction, unlike duplex communication where communication flows both ways. Thus, simplex communication is less complex and less expensive than duplex communication.

Satellites 110 have a bent-pipe configuration in that they only frequency translate and amplify any received energy. This way, one can superimpose radio frequency energy with a modulation and protocol characteristic different from normal traffic to avoid harming the fundamental service. Bent-pipe repeaters translate the L-band signals to C-band down to a co-visible gateway 116. The present invention includes a method of superimposing a different modulation and protocol scheme on an existing satellite communication system 100 (see FIG. 1) to provide low cost, low volume, low data rate telemetry data. Telemetry data is superimposed on return link 132, 134 (see FIGS. 1 and 3) through satellites 110.

Gateway 116 receives the telemetry data superimposed on return link 132, 134 via antennas 118. RF signals from antennas 118 are routed to a downconverter 119 that downconverts the RF signals to intermediate frequency (IF) signals. For each antenna 118, downconverter 119 produces two IF signals 117, namely a right-hand circular polarization (RHCP) signal and a left-hand circular polarization (LHCP) signal, each having an approximate bandwidth of 200 MHz. As gateway 116 has four antennas 118, it provides eight IF signals to gateway applique 138.

Gateway applique 138 is attached to gateway 116 and has Filters/Splitters/Switches hardware 222, decoders 226, and a processor 224 to process, demodulate, and decode telemetry data. Gateway applique 138 has software and hardware to receive or pick-off compound or composite signals 300 (see FIG. 3), in which normal voice and/or data traffic 302 and remote telemetry data 304 are superimposed together. Composite signals 300 are picked-off at the output of gateway 116 and, then, the remote telemetry data 304 is extracted and passed on to back office 200 via network 142. Filters/Splitters/Switches hardware 222 in gateway applique 138 selects and extracts the C-band feederlink frequency corresponding to the uplink L-band frequency $r_1$ to $r_{13}$ from each of the satellite return link beams. Then, a single FDM frequency channel containing the remote telemetry data 304 as well as normal voice and/or data traffic 302 (see FIG. 3) from all the beams is downconverted to a single gateway applique 138 IF signal in the Filters/Splitters/Switches hardware 222.

It was statistically calculated that in practice not all beams illuminate the service area of a given gateway 116. For example, 80 percent of the time, at most 5 L-band beams will typically illuminate a given service area. If all 8-inputs to the gateway applique 116 are open, the resulting input noise could severely degrade the performance of gateway applique 138. Therefore, to minimize input noise and maximize system performance, each of the 8 inputs have a switch that is controlled by commands. These commands are based on the particular set of beams illuminating a given service area. The L-band beam illumination characteristics are a priori determined in gateway operational control center 140 (see FIG. 1) periodically, such as on a minute-by-minute basis for all gateways 116. The appropriate commands to control these switches are sent periodically, such as daily to gateway applique 138 over network 142. Then, a processor 224 within gateway applique 138 uses these control data to turn on and turn off selected switches. In this way, gateway applique 138 receives as input the signals and noise only from those L-band beams that illuminate service areas where remote telemetry units 136 potentially exist.

There is Doppler frequency shift compensation in the remote telemetry system. Doppler frequency shift is due to the movement of satellites 110 relative to a position on Earth. The maximum Doppler component due to the L-band links is ±30 kHz, which is well within gateway applique 138's receiver bandwidth. However, the maximum C-band feederlink component is ±150 kHz, which is beyond gateway applique 138's receiver bandwidth. Consequently, ephemeris data is used by gateway operational control center 140 (see FIG. 1) to determine the C-band Doppler compensation for each pass of each antenna 118 in gateway 116 periodically, such as on a minute-by-minute basis and transferred periodically, such as daily to gateway applique 138 over network 142.

Gateway applique 138 includes a number of decoders 226, such as 8 to accommodate 8 beams within the right or left hand circular polarizations. The 8 inputs to decoders 226 from Filters/Splitters/Switches hardware 222 include normal traffic 302 and remote telemetry data 304 (see FIG. 3). As discussed above, some of these inputs may be turned off and there is Doppler shift compensation. Decoders 226 take the IF signal, despread the pseudo-noise (PN) spread direct sequence spread spectrum (DSSS) signal, detect, and demodulate individual packets of remote telemetry data 304 (see FIG. 4) to local memory. These individual packets are in the presence of other packets as well as normal traffic 302. The despreading and detection of the relatively low-level remote telemetry signals 304 buried in normal traffic 302 is performed by a set of digital signal processing (DSP) algorithms.

Gateway applique 138 also generates and sends diagnostic information to back office 200 periodically, such as daily and weekly. The diagnostic information indicates the ability to meet functional and performance requirements as well as to support fault detection and isolation. Furthermore, gateway applique 138 sends alarm conditions in real-time to back office 200 so that appropriate actions may be taken to maintain system operations. FIG. 2B illustrates how telemetry data and other messages from multiple gateway appliques 138 are passed on to back office 200. Telemetry data is then either automatically forwarded or otherwise made available to appropriate customers 221 over network 142. Gateway appliques 138 are resident in or associated with various gateways 116 around the world. Gateway appliques 138 are connected to back office 200 via network 142.

Back office 200 has a processor and software to receive messages in packets from the gateway applique 138, process them, and pass them on to the appropriate customers 221. Processing includes reconstruction of the packets into a message and authentication. In addition, back office 200 eliminates redundant packets and interfaces with billing and performance analysis systems. Back office 200 serves as a central system for managing the provisioning and activation of the remote telemetry units 136 based on receipt of customer orders. Back office 200 receives and processes the real time, daily and weekly diagnostic messages from each gateway applique 138 and takes appropriate actions. These may include requesting retransmissions of lost packets, warning operators, re-initializing gateway appliques 138, or any other actions needed to maintain the operation of the remote telemetry system.

A regional subnet 228, as shown in FIG. 2B, has gateways 116 connected to small networks 142 to serve customers 221 in a particular region. Regional subnets 228 allow entities ownership, control, and access to customers 221. Back office 200 may be ported to regional subnet 228 and customized to accommodate billing, customer care, and other support infrastructure.

Customers 221 receive messages from back office 200. Error controls are in place to ensure that all messages received in a gateway applique 138 are sent to a designated customer 221. Logs are kept to track operation, such as how many successful messages occurred, how many were unsuccessful, and reasons for the errors. Invalid messages are stored in an error tank for subsequent processing and discards messages with corrupted data. Invalid messages are defined as those messages with an invalid electronic serial number 404 (see FIG. 4).

Figure 3:
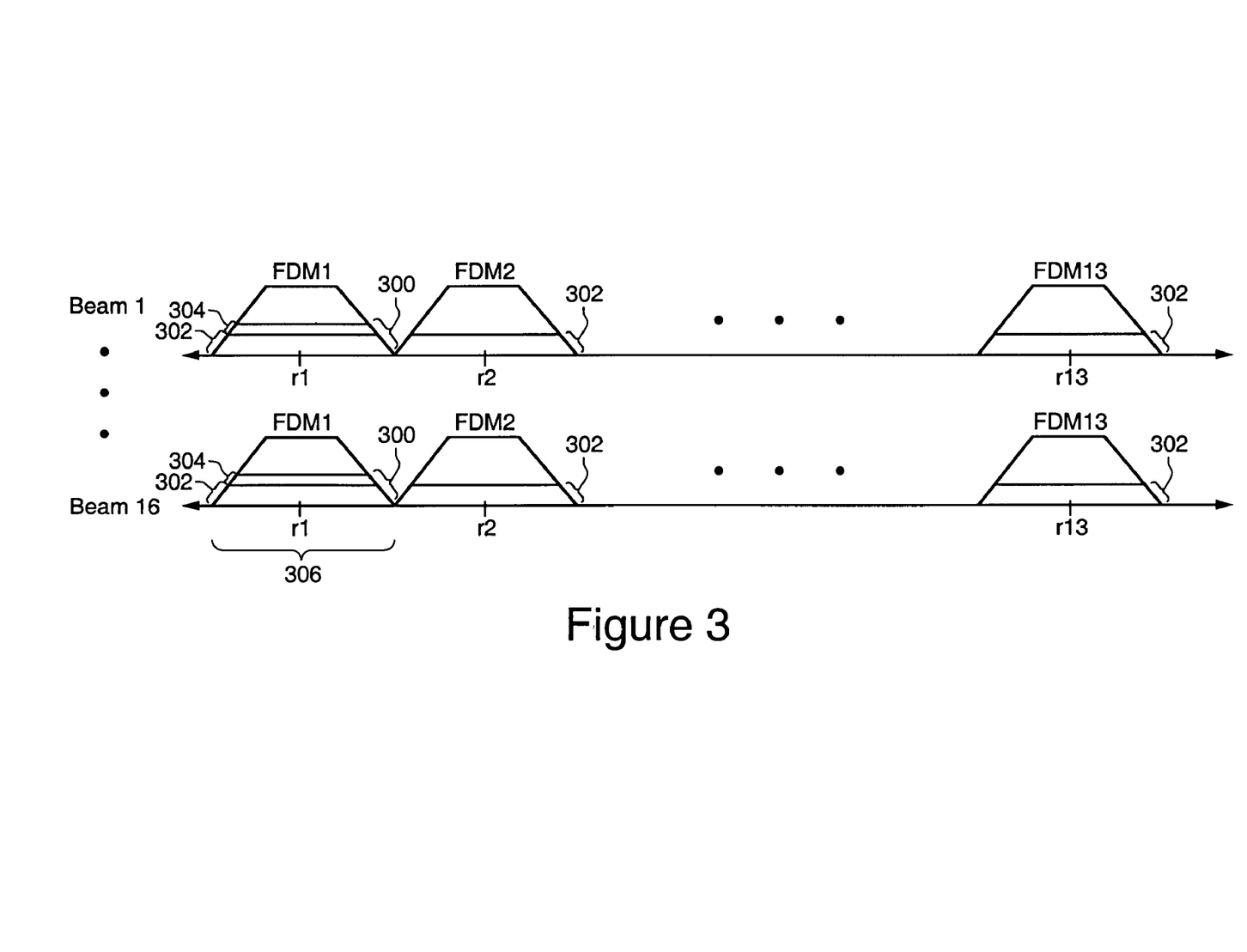
FIG. 3 is a block diagram showing an example compound signal according to an embodiment of the present invention capable of use in the system of FIGS. 2A and 2B.

FIG. 3 shows an example compound or composite signal 300 for use in the remote telemetry system. Composite signal 300 has remote telemetry data 304 superimposed on normal traffic 302. Composite signal 300 may be in a predetermined FDM channel 306. Alternately, remote telemetry data 304 may be superimposed in an FDM channel 306 that is fallow of normal traffic, i.e., the telemetry data would be sole signals in the FDM channel 306.

Figure 4:
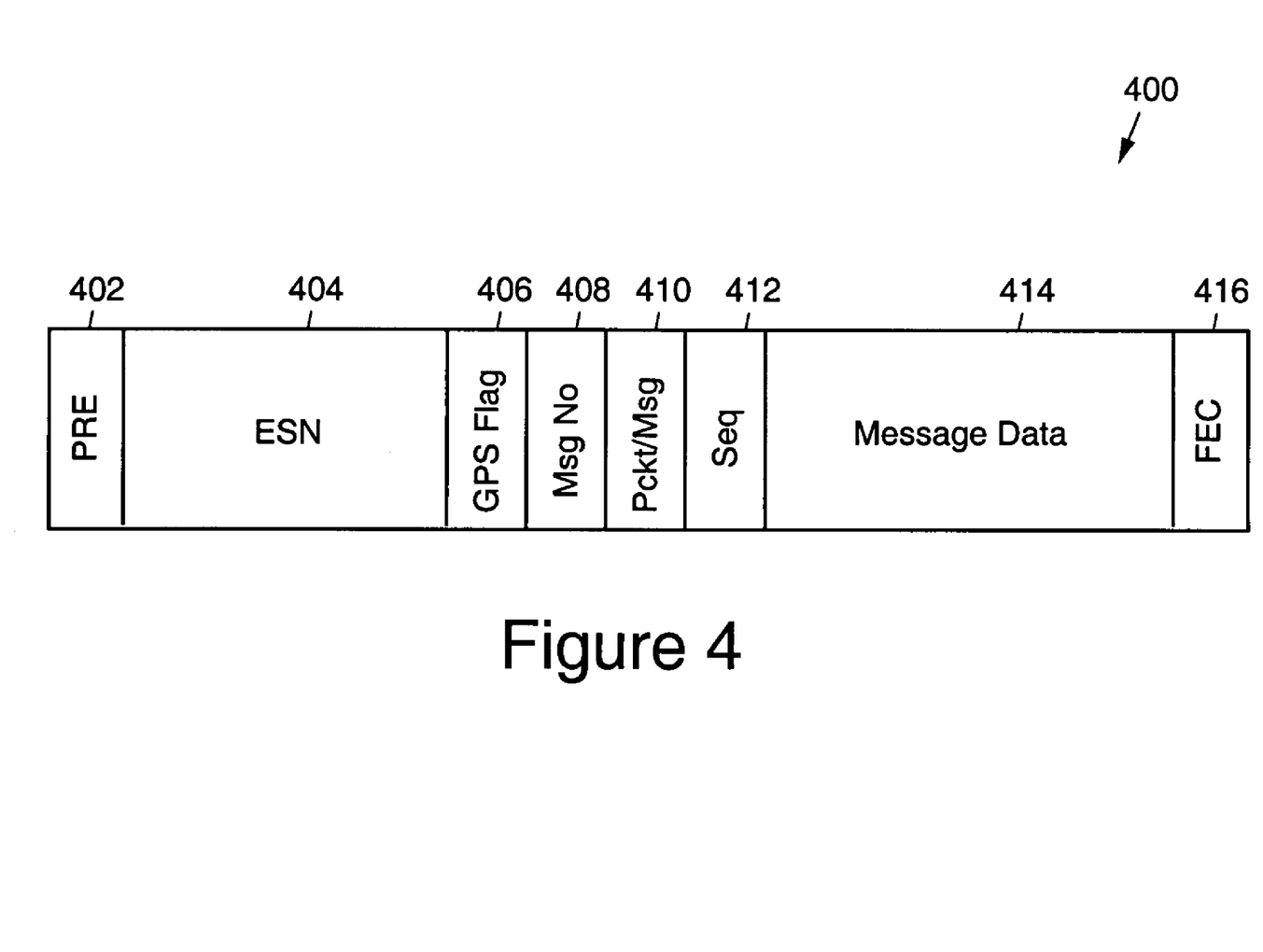
FIG. 4 is a block diagram showing an example data structure according to an embodiment of the present invention capable of use in the system of FIGS. 2A and 2B.

FIG. 4 shows an example format of a data structure 400 capable of being transmitted by remote telemetry unit 136 over the remote telemetry system. Referring to FIG. 2A, binary data from sensors 204 and sensor interfaces 206 is transferred to simplex transmitting unit 210 over a standard RS232 interface where it is formatted into a message comprising one or more data structures 400. In the example shown in FIG. 4, data structure 400 is an individual packet that is 128 bits long and contains the following fields: a preamble 402, an electronic serial number (ESN) 404, a global positioning system (GPS) flag 406, a message number 408, a number of packets 410, a sequence number 412, a message data 414, and a forward error correction (FEC) code 416. The fields of data structure 400 may be any length, however, exemplary lengths are given below for each field.

Preamble 402 is 10 bits long and is a series of bits used by gateway applique 138 to acquire and lock on to the transmission.

Electronic serial number 404 is 27 bits long and is used in identifying a specific remote telemetry unit 136. Electronic serial number 404 is used in correlating messages to remote telemetry units 136 and for sending resulting messages to appropriate customers 221.

GPS flag 406 is 1 bit long and indicates whether a given remote telemetry unit 136 is associated with a mobile remote asset with a built-in GPS receiver for determining its location on Earth. GPS flag 406 can be used by either gateway applique 138 or back office 200 to distinguish mobile assets from stationary ones and to process received data appropriately.

Message number 408 is 4 bits long, which means that 16 unique messages are transmitted by each remote telemetry unit 136. Each message transmitted by remote telemetry unit 136 has message number 408. Since many more than 16 messages will be transmitted by each remote telemetry unit 136, back office 200 keeps track of message number 408 and maintains a master count of the number of unique messages coming from a given remote telemetry unit 136. The master count of the total number of messages transmitted by remote telemetry unit 136 is given to customers 221. Customers 221 can use message number 408 to check that messages were not lost, for example.

A number of packets 410 is 4 bits long and tells how many packets are in a particular message. Each message can contain up to 16 packets (transmissions). Therefore, in order to reconstruct a message, gateway applique 138 or back office 200 needs to know how many packets are in a particular message.

Sequence number 412 is 4 bits long and tells where a packet is in the sequence of packets for a particular message. In this example, 4 bits allows for 16 possible packets per message. Sequence number 412 is used to reconstruct longer length messages in either gateway applique 138 or back office 200. Since each packet is a separate transmission, it is possible that packets will be received out of sequence. For example, packet #7 may arrive before packet #6 at back office 200. Gateway applique 138 or back office 200 needs to know the sequence of the received packet, i.e. is this packet the $7^{th}$ or $6^{th}$ of 16, in order to reconstruct the entire multi-packet message. Therefore, a combination of number of packets 410 and a sequence number 412 are used to reconstruct the entire multi-packet message, regardless of the order in which packets are received.

Message data 414 is 72 bits and stores the binary data from sensors 204. In this example, data from each packet can be up to 72 bits. Thus, the maximum length of a message is 16 packets/message times 72 bits/packet equals 1,152 bits or 144 bytes.

Forward error correction code 416 is 14 bits and is used to enhance system performance. In this example, the 14 bits are used for a Bose-Chaudhuri-Hocquenghen (BCH) code that provides roughly 2.5 dB of system performance enhancement.

Referring again to FIG. 2A, the individual data packet is formed in simplex transmitting unit 210's baseband processor 212. The individual data packet is then pseudo-noise spread in PN spreader 214 into a DS-CDMA signal a little bit over two FDM channels (2.5 MHz). The individual data packet is then modulated in modulator 216 with a different biphase shift keying (BPSK) modulation scheme, quadrature phase shift keying (QPSK). Then, the individual data packet is upconverted in RF upconverter 218 to the return link frequency, amplified, and transmitted to satellites 110 through a simple, omni-directional, low-cost antenna by power amplifier/antenna 220. For example, a small patch can be mounted in remote telemetry unit 136 with an RF transparent radome.

To optimize system performance, remote telemetry unit 136 can be set to transmit at two different power levels, a low level and a high level. The low level is used when remote telemetry unit 136 is deployed in an environment with a clear line-of-sight to satellites 110. The high level is used, for example, when remote telemetry unit 136 is deployed under some foliage. Foliage attenuation characteristics of L-band RF energy is accounted for by the field installer by appropriately setting this binary transmit power level at the time of field installation. Therefore, remote telemetry data 304 energy is superimposed over about two FDM channels. This significantly reduces the thermal noise or interference effect on normal traffic 302. As a result, remote telemetry data 304 injects additional noise into the system and vice-versa. This is accounted for in sizing remote telemetry unit 136's transmit power (CDMA interference analysis) as well as overall system performance analysis. If the spreading was over a single channel, the interference would be double what it is under this scheme.

First, given the visibility of multiple satellites 110 and beams to any given point on Earth, simplex transmitting unit 210 is transmitting through the omni-directional antenna of power amplifier/antenna 220, so duplicate copies of the remote telemetry packets will be present in gateway applique 138. Remote telemetry packets may be arriving through multiple beams of multiple satellites 110. Second, depending on the location of remote telemetry unit 136, multiple gateways 116 will be visible through the same satellite or different satellites 110 for a given remote telemetry unit 136. Furthermore, because there is no acknowledgement of packet reception in simplex communications, the packet transmissions are repeated to increase the probability of detection. As a result, even more duplicate packets are created. Duplicates are disregarded so that only a single copy of each message from any given remote telemetry unit 136 is passed onto the appropriate customer 221. This filtering and reconstruction is performed in gateway applique 138 and/or back office 200.

It is to be understood that the above description is intended to be illustrative, and not restrictive. Many other embodiments will be apparent to those of skill in the art upon reviewing the above description. Various embodiments for gathering, processing and routing telemetry data over an existing satellite system are described in the context of direct sequence (DS) spreading with code division multiple access (CDMA) (DS-CDMA) communication system. However, the present invention has applicability to many other satellite communication systems that may use, for example, frequency domain multiple access (FDMA) techniques. The present invention may also be applied to other than low-earth-orbiting communication systems. Therefore, the scope of the present invention should be determined with reference to the appended claims, along with the full scope of equivalents to which such claims are entitled.

What is claimed is:

1. A method for routing telemetry data, comprising:
   receiving telemetry data in a simplex mode at a satellite having a bent-pipe configuration, wherein said telemetry data is combined with normal traffic in a compound signal;
   transmitting said compound signal from said satellite to a gateway appliqué; and
   extracting said telemetry data from said compound signal at said gateway appliqué, wherein said gateway appliqué compensates for Doppler shift of said compound signal.

2. The method according to claim 1, wherein said telemetry data is received from a remote telemetry unit.

3. The method according to claim 1, further comprising:
   receiving said telemetry data repeatedly; and
   disregarding duplicate telemetry data.

4. The method according to claim 1, further comprising:
   transmitting said telemetry data from said gateway applique to a processor for routing to a customer.

5. The method according to claim 1, wherein said telemetry data is transmitted from a remote telemetry unit to said satellite, without obtaining permission from said satellite.

6. The method according to claim 1, wherein said satellite is a low-earth-orbit satellite.

7. The method according to claim 1, wherein said telemetry data is gathered from a sensor at a remote asset.

8. The method according to claim 1, wherein said normal traffic includes voice traffic.

9. A method for routing telemetry data, comprising:
   transmitting said telemetry data via a telemetry unit in a simplex mode to a satellite over a low-earth-orbit communications system, wherein said telemetry data is superimposed over regular traffic on said low-earth-orbit communications system, thereby forming a compound signal, wherein said telemetry data is formatted in a data structure comprising a message data field for storing information from a sensor at a remote asset, and a sequence number field for reconstructing said information.

10. A system for routing telemetry data, comprising:
    a gateway subsystem having an antenna for receiving a compound signal transmitted using simplex mode via a satellite having a bent-pipe configuration, wherein said compound signal comprises telemetry data superimposed on normal traffic; and
    a gateway appliquéfor receiving said compound signal, extracting said telemetry data, and transmitting said telemetry data to a network, wherein said gateway appliquécompensates for a Doppler shift of said compound signal.

11. A method for routing telemetry data, comprising:
    transmitting said telemetry data via a telemetry unit in a simplex mode to a satellite over a low-earth-orbit communications system, wherein said telemetry data is superimposed over regular traffic on said low-earth-orbit communications system, thereby forming a compound signal, wherein said telemetry data is formatted in a data structure comprising a message data field for storing information from a sensor at a remote asset, and a field for reconstructing said information.

12. The method according to claim 11, wherein said telemetry data is received from a remote telemetry unit.

13. The method according to claim 11, further comprising:
    receiving said telemetry data repeatedly; arid
    disregarding duplicate telemetry data.

14. The method according to claim 11, wherein said telemetry data is transmitted from a remote telemetry unit to said satellite, without obtaining permission from said satellite.

15. The method according to claim 11, wherein said satellite is a low-earth-orbit satellite.

16. The method according to claim 11, wherein said telemetry data is gathered from a sensor at a remote asset.

17. The method according to claim 11, wherein said normal traffic includes voice traffic.

18. A method for routing telemetry data, comprising:
    transmitting said telemetry data via a telemetry unit in a simplex mode to a satellite over a low-earth-orbit communications system, wherein said telemetry data is superimposed over regular traffic on said low-earth-orbit communications system, thereby forming a compound signal, wherein said telemetry data is formatted in a data structure comprising a message data field for storing information from a sensor at a remote asset, and an identification field identifying the telemetry unit.

19. The method according to claim 18, further comprising:
    receiving said telemetry data repeatedly; and
    disregarding duplicate telemetry data.

20. The method according to claim 18, wherein said telemetry data is transmitted from a remote telemetry unit to said satellite, without obtaining permission from said satellite.

21. The method according to claim 18, wherein said satellite is a low-earth-orbit satellite.

22. The method according to claim 18, wherein said normal traffic includes voice traffic.

* * * * *